United States Patent
Sellstedt et al.

[15] 3,692,774
[45] Sept. 19, 1972

[54] 2-CARBOXAMIDO PENICILLIN DERIVATIVES

[72] Inventors: John H. Sellstedt, 266 Iven Ave., St. Davids, Pa. 19087; Milton Wolf, 1100 Westchester Pike, West Chester, Pa. 19380

[22] Filed: Aug. 31, 1970
[21] Appl. No.: 68,527

[52] U.S. Cl..................................260/239.1, 424/271
[51] Int. Cl. ...................................................C07d 99/16
[58] Field of Search...................................260/239.1

[56] References Cited

UNITED STATES PATENTS 3,383,383  5/1968  Gapp et al. ..............260/239.1
3,453,264  7/1969  Fosker et al. ............260/239.1

Primary Examiner—Nicholas S. Rizzo
Attorney—Andrew Kafko, Edmund H. O'Brien, Joseph Martin Weigman, Dwight J. Potter, Vito Victor Bellino and Robert Wiser

[57] ABSTRACT

Phenoxymethyl, α-aminobenzyl and phenylimidazolidinyl penicillin derivatives are prepared. The compounds are effective antibacterials with a substantial spectrum of activity and good duration of action.

7 Claims, No Drawings

2-CARBOXAMIDO PENICILLIN DERIVATIVES

This invention relates to new synthetic penicillins and more particularly to carboxamido penicillin derivatives having an extended period of effective antibiotic activity.

Antibiotics prepared for medicinal use are generally put into a form where they are soluble in body fluids. Insofar as penicillins are concerned, their solubility in body fluids or in a largely aqueous system have required forming a salt of such penicillins whose solubility in water varied in accordance with the type of base used to react with the penicillin. For example, an alkali metal salt of a penicillin is known to be highly water soluble but its antibiotic effectiveness is relatively short. On the other hand, using an organic base and particularly selected alkylenediamine bases will form acid-addition salts with penicillins that are very sparingly soluble in water and characterized by a long duration of action. The latter characteristic, however, has the limiting effect of yielding very low blood levels of penicillin. The present invention seeks to improve blood levels and yet retain a reasonably extended duration of antibiotic activity.

The compounds of the invention found to achieve the aforesaid desirable characteristics may be represented by the structural formula designated as follows:

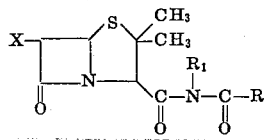

In the above illustration, X is intended to represent any of the known penicillin radicals attaching to the 6-position of the penicillin moiety but preferable either an acetamido radical particularly a phenoxyacetamido or 2-amino-2-phenyl-acetamido or a "condensed" acetamido group such as a substituted phenylimidazolidinyl radical, e.g., the 6-position radical of hetacillin.

The radicals or symbols R and $R_1$ are intended to separately represent a lower alkyl of one to four carbon atoms, a haloalkyl, e.g., trifluoromethyl, or aryl, preferably a monocyclic aryl such as phenyl, methoxyphenyl, or aralkyl, preferably benzyl and one of R and $R_1$ but not both may be hydrogen. Additionally, when taken together, R and $R_1$ combined with the amido moiety and represented by

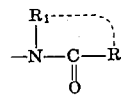

may stand for either

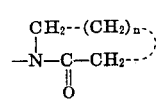

in which $n$ is a whole number from 1 to 4; or the radicals:

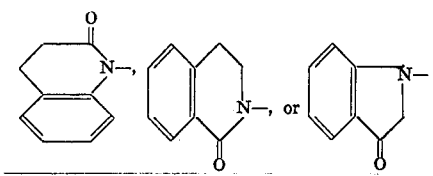

Reverting to the imidazolidinyl radical previously mentioned, this is illustrated with greater specificity by the formula:

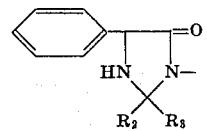

in which the radicals $R_2$ and $R_3$ separately represent hydrogen or lower alkyl of one to four carbon atoms, and when taken together they may represent $-(CH_2)_n-$; $-(CH_2)_2-O-(CH_2)_2-$; or

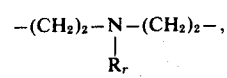

where $n$ is a whole number 3, 4, 5, 6, or 7, and where $R_4$ is a lower alkyl of one to four carbon atoms or aryl, preferably phenyl or benzoyl.

The compounds of the invention are prepared by starting with a selected penicillanic acid, preferably one of those described in Behrens et al., U.S. Pat. No. 2,562,410 or Brandt et al., U.S. Pat. No. 2,756,226; or in Doyle et al., U.S. Pat. No. 2,985,648 or Grant et al., U.S. Pat. No. 3,144,445; or in Johnson et al., U.S. Pat. No. 3,198,804 or Alburn et al., U.S. Pat. No. 3,351,587. The selected penicillanic acid, either as such (I) or in the form of its alkali metal or amine salt, in a solvent such as methylene chloride is reacted with an iminochloride (II), under ambient temperatures, a reaction in the form of a rearrangement takes place to form the final desired compound (III). The reaction steps are best illustrated by the reaction scheme as shown:

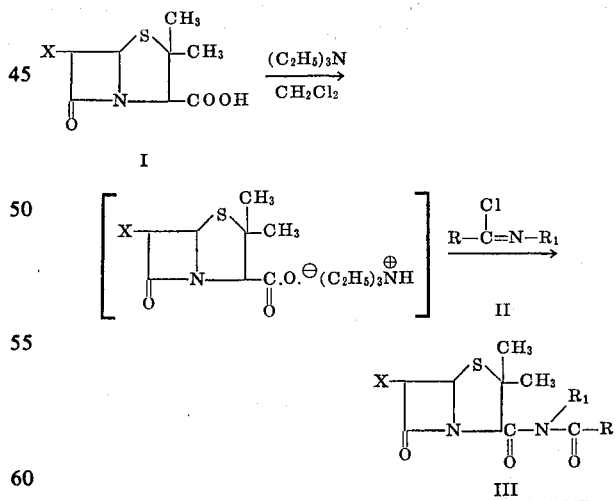

When the iminochloride II is one having joined R and $R_1$ radicals as described above, this type of reactant would fall within one of the illustrated structures shown herein:

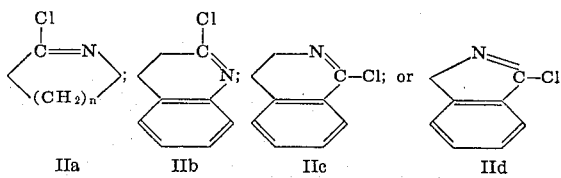

In formula IIa, the symbol n would represent the integers previously assigned, namely, 1 to 4. All of the reactants are either known compounds or, with respect to the iminochlorides, if these are not easily available, they may be prepared by known means as taught by von Braun and Pinkernelle in Ber. 67, 1218 (1934), Huisgen, Sauer and Seidel, Ber. 93, 2885 (1960), or by H. Ulrich in "The Chemistry of Imidoyl Halides," Plenum Press, New York, 1968. In general, the preparation merely involves the chlorination of an N-substituted amide with thionyl chloride.

The compounds of the invention have been found to be effective against gram-positive and gram-negative test organisms at an inhibitory concentration below 1,000 μg./ml. using the well-known and scientifically accepted agar serial dilution technique. Typical test organisms of the gram-positive type are, for example, *Bacillus subtilis* and *Staphylococcus aureus*; tests organisms of the gram-negative type are, for example, *Enterobacter aerogenes*, *Neisseria catarrhalis*, *Escherichia coli*, or *Proteus vulgaris*. Duration of activity tests are carried out pharmacologically with animals using either mice or rabbits under scientifically accepted procedures. The compounds are therefore useful in the fields of comparative pharmacology and microbiology.

The following examples are provided for illustrative purposes in preparing compounds of the invention by the best mode contemplated herein.

EXAMPLE 1

N-Benzoyl-3,3-dimethyl-7-oxo-6-(2-phenoxyacetamido)-N-phenyl-4-thia-1-azabicyclo[3.2.0]heptane-2-carboxamide 3,3-Dimethyl-7-oxo-6-(2-phenoxyacetamido)-4-thia-1-azabicyclo[3.2.0]heptane-2-carboxylic acid (8.75 g., 0.025 mole) is added to anhydrous methylene chloride (200 ml.) followed by triethylamine (2.53 g., 0.025 mole), giving a solution. Then solid N-phenylbenzimidoyl chloride (5.4 g., 0.025 mole) is added to the stirred solution, and the resulting solution is kept at room temperature for 2 hours. The solution is then washed once with cold water, once with cold 0.13 M/pH 7.4/($K_2HPO_4$/$KH_2PO_4$) buffer, and dried through sodium sulfate. The filtrate is dried over magnesium sulfate, and then concentrated at 40° under vacuum, giving a foam. The foam is dissolved in anhydrous ether (≈150 ml.) and the solution is filtered into a liter Erlenmeyer flask. The solution is stirred in an ice bath, and pentane (≈600 ml.) is added all at once, giving a solid. The mixture is stirred and the solid is rubbed with a glass rod for about one-half hour until the solid becomes more crystalline. The mixture is filtered, giving a white solid (6.5 g., 49 percent), m.p. (80° soften) 95°–100° (uncorr.).

Analysis Calcd. for $C_{29}H_{27}N_3O_5S$:
 C, 65.77; H, 5.14; N, 7.93.
Found: C, 65.82; H, 5.38; N, 7.89.

EXAMPLE 2

N-Benzoyl-N,3,3-trimethyl-7-oxo-6-(2-phenoxyacetamido)-4-thia-1-azabicyclo[3.2.0]heptane-2-carboxamide 3,3-Dimethyl-7-oxo-6-(2-phenoxyacetamido)-4-thia-1-azabicyclo[3.2.0]heptane-2-carboxylic acid (3.51 g., 0.01 mole) is added to anhydrous methylene chloride (100 ml.) followed by triethylamine (1.01 g., 0.01 mole), giving a solution. Then N-methylbenzimidoyl chloride (1.54 g., 0.01 mole) is added all at once, and the solution is reacted and worked-up in a manner similar to Example 1, giving a white solid (2.5 g., 53 percent), m.p. 91°–93° (uncorr.).

Analysis Calcd. for $C_{24}H_{25}N_3O_5S$:
 C, 61.65; H, 5.39; N, 8.99.
Found: C, 62.63; H, 5.74; N, 8.28.

EXAMPLE 3

6-(D-(-)-2-Amino-2-phenylacetamido)-N-benzoyl-3,3-dimethyl-7-oxo-N-phenyl-4-thia-1-azabicyclo[3.2.0]heptane-2-carboxamide Triethylamine (1.01 g., 0.01 mole) is added to a mixture of 6-(D-(-)-2-amino-2-phenylacetamido)-3,3-dimethyl-7-oxo-4-thia-1-azabicyclo[3.2.0]heptane-2-carboxylic acid (3.49 g., 0.01 mole) and methylene chloride (100 ml.) and the mixture is stirred three-fourths hour at room temperature. Then solid N-phenylbenzimidoyl chloride (2.16 g., 0.01 mole) is added all at once, and the mixture is stirred 2 hours at room temperature. An insoluble solid is filtered off, and the filtrate is washed twice with cold water, twice with cold 0.13 M/pH 7.4/($K_2HPO_4$/$KH_2PO_4$) buffer, and dried through sodium sulfate. The resulting filtrate is dried over magnesium sulfate, and then concentrated at 40° under vacuum, giving a foam (2.3 g., 44 percent). The foam is dissolved in a minimum amount of methylene chloride (≈10 ml.) and anhydrous ether (≈30 ml.) is added to the cloud point. The solution is filtered and the filtrate is stirred in a 250 ml. Erlenmeyer flask in an ice bath. Then pentane (100 ml.) is added all at once, giving a white solid. The solid is stirred for ≈½ hour, and the mixture is filtered giving a white solid (1.3 g., 25 percent), m.p. 119°–146° (uncorr.).

Analysis Calcd. for $C_{29}H_{28}N_4O_4S$:
 C, 65.89; H, 5.34; N, 10.60.
Found: C, 68.04; H, 4.74; N, 9.76.

EXAMPLE 4

6-(D-(-)-2-Amino-2-phenylacetamido)-N-benzoyl-N,3,3-trimethyl-7-oxo-4-thia-1-azabicyclo[3.2.0]heptane-2-carboxamide Triethylamine (1.01 g., 0.01 mole) is added to a mixture of 6-(D-(-)-2-amino-2-phenylacetamido)-3,3-dimethyl-7-oxo-4-thia-1-azabicyclo[3.2.0]heptane-2-carboxylic acid (3.49 g., 0.01 mole) and methylene chloride (100 ml.), and the mixture is stirred three-fourths hour at room temperature. Then N-methylbenzimidoyl chloride (1.54 g., 0.01 mole) is added all at once, and the mixture is reacted and worked-up in a manner similar to Example 1, giving a white solid (1.8 g., 39 percent), m.p. 102°–121° (uncorr.).

Analysis Calcd. for $C_{24}H_{26}N_4O_4S$:
 C, 61.78; H, 5.61; N, 12.01.
Found: C, 66.49; H, 6.35; N, 12.05.

EXAMPLE 5

N-Benzoyl-6-(2,2-dimethyl-5-oxo-4-phenylimidazolidin-1-yl)-3,3-dimethyl-7-oxo-N-phenyl-4-thia-1-azabicyclo[3.2.0]heptane-2-carboxamide 6-(2,2-Dimethyl-5-oxo-4-phenylimidazolidin-1-yl)-3,3-dimethyl27-oxo-4-thia-1-azabicyclo[3.2.0]heptane-2-carboxylic acid (3.90 g., 0.01 mole) is added to anhydrous methylene chloride (100 ml.) followed by triethylamine (1.01 g., 0.01 mole), giving a solution. Then solid N-phenylbenzimidoyl chloride (2.16 g., 0.01 mole) is added all at once to the stirred solution, and the resulting solution is kept at room temperature for 2 hours. Then the solution is washed twice with cold water, twice with cold 0.13 M/pH 7.4/($K_2HPO_4$/$KH_2PO_4$) buffer and dried through sodium sulfate. The resulting filtrate is dried over magnesium sulfate, and then concentrated at 40° under vacuum, giving a white foam. The foam is dissolved in methylene chloride ($\approx$10 ml.) and anhydrous ether is added to the cloud point ($\approx$40 ml.). The solution is filtered and the filtrate is stirred in a 250 ml. Erlenmeyer flask in an ice bath. Pentane (200 ml.) is added all at once, giving a white solid. The solid is rubbed with a glass rod and stirring is continued for about one-half hour, until the solid becomes more crystalline. The mixture is filtered, giving a white solid (3.5 g., 62 percent), m.p. 108°–117° (uncorr.).

Analysis Calcd. for $C_{32}H_{32}N_4O_4S$:
C, 67.58; H, 5.67; N, 9.85; S, 5.64.
Found: C, 66.98; H, 5.45; N, 8.38; S, 5.57.

EXAMPLE 6

N-Benzoyl-6-(2,2-dimethyl-5-oxo-4-phenylimidazolidin-1-yl)-N,3,3-trimethyl-7-oxo-4-thia-1-azabicyclo[3.2.0heptane-2-carboxamide 6-(2,2-Dimethyl-5-oxo-4-phenylimidazolidin-1-yl)-3,3-dimethyl-7-oxo-4-thia-1-azabicyclo[3.2.0]heptane-2-carboxylic acid (3.90 g., 0.01 mole) is added to methylene chloride (100 ml.) followed by triethylamine (1.01 g., 0.01 mole), giving a solution. Then N-methylbenzimidoyl chloride (1.54 g., 0.01 mole) is added all at once, and the solution is reacted and worked-up in a manner similar to Example 1, giving a white solid (3.7 g., 73 percent) m.p. 105°–117° (uncorr.).

Analysis Calcd. for $C_{27}H_{30}N_4O_4S$:
C, 64.01; H, 5.97; N, 11.06.
Found: C, 64.40; H, 6.29; N, 11.28.

The invention claimed is:

1. An antibiotic compound having the formula:

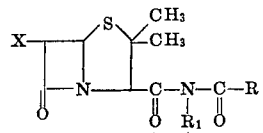

wherein
X is an acetamido radical of the group consisting of 2-amino-2-phenylacetamido, 2-phenoxyacetamido, and

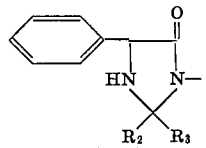

in which
$R_2$ and $R_3$ are independently hydrogen or lower alkyl of one to four carbon atoms; and
R and $R_1$ are members independently selected from the group consisting of a lower alkyl radical of one to four carbon atoms and the phenyl radical.

2. As a compound of claim 1; N-benzoyl-3,3-dimethyl-7-oxo-6-(2-phenoxyacetamido)-N-phenyl-4-thia-1-azabicyclo[3.2.0]-heptane-2-carboxamide.

3. As a compound of claim 1; N-benzoyl-N,3,3-trimethyl-7-oxo-6-(2-phenoxyacetamido)-4-thia-1-azabicyclo[3.2.0heptane-2-carboxamide.

4. As a compound of claim 1; 6-(D-(-)-2-amino-2-phenylacetamido)-N-benzoyl-3,3-dimethyl-7-oxo-N-phenyl-4-thia-1-azabicyclo[3.2.0]heptane-2-carboxamide.

5. As a compound of claim 1; 6-(D-(-)-2-amino-2-phenylacetamido)-N-benzoyl-N,3,3-trimethyl-7-oxo-4-thia-1-azabicyclo-[3.2.0]heptane-2-carboxamide.

6. As a compound of claim 1; N-benzoyl-6-(2,2-dimethyl-5-oxo-4-phenylimidazolidin-1-yl)-3,3-dimethyl-7-oxo-N-phenyl-4-thia-1-azabicyclo[3.2.0]heptane-2-carboxamide.

7. As a compound of claim 1; N-benzoyl-6-(2,2-dimethyl-5-oxo-4-phenylimidazolidin-1-yl)-N,3,3-trimethyl-7-oxo-4-thia-1-azabicyclo[3.2.0]heptane-2-carboxamide.

* * * * *

PO-1050
(5/69)

UNITED STATES PATENT OFFICE
CERTIFICATE OF CORRECTION

Patent No. 3,692,774     Dated September 19, 1972

Inventor(s) John H. Sellstedt and Milton Wolf

It is certified that error appears in the above-identified patent and that said Letters Patent are hereby corrected as shown below:

On the cover sheet, insert -- [73] Assignee: American Home Products Corporation, New York, N.Y. -- .

Column 5, line 2, after "dimethyl", delete "2" and insert a hyphen --  -  --;

Column 6, Claim 3, line 3, after [3.2.0 insert a closing bracket -- ] --.

Signed and sealed this 8th day of May 1973.

(SEAL)
Attest:

EDWARD M. FLETCHER, JR.
Attesting Officer

ROBERT GOTTSCHALK
Commissioner of Patents